United States Patent
Aoyama et al.

(10) Patent No.: US 11,370,672 B2
(45) Date of Patent: Jun. 28, 2022

(54) GAS COLLECTING METHOD

(71) Applicant: Chiharu Aoyama, Tokyo (JP)

(72) Inventors: Chiharu Aoyama, Tokyo (JP); Daiki Aoyama, Tokyo (JP)

(73) Assignee: Chiharu Aoyama, Tokyo (JP)

( * ) Notice: Subject to any disclaimer, the term of this patent is extended or adjusted under 35 U.S.C. 154(b) by 1014 days.

(21) Appl. No.: 16/071,305

(22) PCT Filed: Jan. 18, 2017

(86) PCT No.: PCT/JP2017/001500
§ 371 (c)(1),
(2) Date: Jul. 19, 2018

(87) PCT Pub. No.: WO2017/126533
PCT Pub. Date: Jul. 27, 2017

(65) Prior Publication Data
US 2021/0206659 A1   Jul. 8, 2021

(30) Foreign Application Priority Data

Jan. 21, 2016  (JP) .............................. JP2016-009815

(51) Int. Cl.
*C02F 1/20* (2006.01)
*E21B 41/00* (2006.01)
(Continued)

(52) U.S. Cl.
CPC .................. *C02F 1/20* (2013.01); *C02F 1/44* (2013.01); *E21B 41/0099* (2020.05);
(Continued)

(58) Field of Classification Search
CPC .... C02F 1/20; C02F 1/44; E21B 41/00; E21B 41/0099
See application file for complete search history.

(56) References Cited

U.S. PATENT DOCUMENTS 3,926,056 A * 12/1975 Brown ................. G01C 13/008
73/753
4,749,254 A   6/1988 Seaver
(Continued)

FOREIGN PATENT DOCUMENTS

CN   104854302 A   8/2015
CN   105019868 A   11/2015
(Continued)

OTHER PUBLICATIONS

JP 2000-282775 A_English Translation (Year: 2000).*
(Continued)

*Primary Examiner* — Youngsul Jeong

(57) ABSTRACT

In a gas collecting method for collecting gas yielding from source material on a sea bottom, [1] releasing a collecting membrane into water, a fixture being connected with a lower end of the collecting membrane and the collecting membrane being flared downward from its top; [2] keeping a three-dimensional position of the fixture at a target position with its autonomous navigation by a position maintainer provided in the fixture; [3] based on vertical water temperature distribution, setting the lower end at a position that is higher than the sea bottom and shallower than a water depth where the source material separates from its solid state into water and gas and setting the top at a deeper position than a water depth where bubbles of the gas disappear due to mixture of the gas with seawater; and [4] collecting the gas released from the sea bottom by the collecting membrane.

3 Claims, 5 Drawing Sheets

(51) Int. Cl.
*C02F 1/44* (2006.01)
*C02F 101/32* (2006.01)
*C02F 103/00* (2006.01)
*C02F 103/08* (2006.01)

(52) U.S. Cl.
CPC .... *C02F 2101/32* (2013.01); *C02F 2103/007* (2013.01); *C02F 2103/08* (2013.01); *C02F 2209/02* (2013.01)

(56) References Cited

U.S. PATENT DOCUMENTS

| | | | |
|---|---|---|---|
| 7,546,880 B2 | 6/2009 | Zhang et al. | |
| 2003/0214175 A1 | 11/2003 | Baciu | |
| 2008/0135257 A1 | 6/2008 | Zhang et al. | |
| 2013/0108369 A1* | 5/2013 | Splittstoesser | E21B 43/0122 405/63 |
| 2015/0354957 A1 | 12/2015 | Tian et al. | |

FOREIGN PATENT DOCUMENTS

| | | | | |
|---|---|---|---|---|
| JP | 10-29785 A | | 2/1998 | |
| JP | 2000-282775 A | | 10/2000 | |
| JP | 2000282775 A | * | 10/2000 | ......... E21B 41/0099 |
| JP | 2003-284940 A | | 10/2003 | |
| JP | 2004-271326 A | | 9/2004 | |
| JP | 2010-037932 A | | 2/2010 | |
| JP | 2010-261252 A | | 11/2010 | |
| JP | 2010-284605 A | | 12/2010 | |
| JP | 2011-052493 A | | 3/2011 | |
| JP | 2012-021357 A | | 2/2012 | |
| JP | 2012-111708 A | | 6/2012 | |
| JP | 3184629 U | | 7/2013 | |
| RU | 2 078 199 C1 | | 4/1997 | |
| RU | 87 263 U1 | | 9/2009 | |
| WO | 2006/070577 A1 | | 7/2006 | |
| WO | 2012/007389 A2 | | 1/2012 | |
| WO | 2015/003980 A1 | | 1/2015 | |

OTHER PUBLICATIONS

Communication dated Feb. 21, 2019, from the Russian Federal Service for Intellectual Property in counterpart Application No. 2018130067/03.

Communication dated Nov. 27, 2019 from the China National Intellectual Property Administration in counterpart Application No. 201780007397.9

Trial Decision issued on Feb. 26, 2021 by the Korean Patent Office in application No. 10-2018-7024057; Trial No. 2020 1384.

Extended European Search Report dated Aug. 16, 2019 issued by the European Patent Office in counterpart Application No. 17741410.9.

Communication dated Sep. 24, 2019 from Australian Patent Office in counterpart AU Application No. 2017210423.

Communication dated Feb. 24, 2021 from the European Patent Office in Application No. 17741410.9.

Communication dated Sep. 1, 2020 from the State Intellectual Property Office of the P.R.C. in Application No. 201780007397.9.

Communication dated Mar. 1, 2019 from Australian Patent Office in counterpart AU Application No. 2017210423.

Communication dated Apr. 17, 2020 from the Korean Intellectual Property Office in KR Application No. 10-2018-7024057.

Communication dated Oct. 22, 2019, from the Intellectual Property of India in counterpart application No. 201847027250.

Ryu, Byong-Jae et al., Effect of Electrolytes on Methane Hydrate Equilibrium Condition and Stability Field, Petroleum & Marine Division, Korea Institute of Geology, Mining & Materials Department of Chemical Engineering, Korea Advanced Institute of Science and Technology, Mar. 6, 2000, pp. 380-386, vol. 38, No. 3.

Notification of Reason for Refusal dated Sep. 9, 2019 in counterpart KR Application No. 10-2018-7024057.

Notification of Reason for Refusal for corresponding JP 2016-009815, dated Apr. 12, 2016.

Decision of Refusal for corresponding JP 2016-009815, dated Aug. 23, 2016.

Report for Reconsideration by Examiner before Appeal corresponding JP 2016-009815, dated Feb. 13, 2017.

Notification of Reasons for Refusal for corresponding JP 2016-9815, dated Nov. 7, 2017.

Appeal Decision for corresponding JP 2016-9815, dated Mar. 6, 2018.

International Search Report for PCT/JP2017/001500, dated Apr. 18, 2017.

Communication dated Jan. 19, 2021 by the China National Intellectual Property Administration in Chinese Application No. 201780007397.9.

\* cited by examiner

GAS COLLECTING METHOD

CROSS REFERENCE TO RELATED APPLICATIONS

This Application is a National Stage of International Application No. PCT/JP2017/001500 filed Jan. 18, 2017, claiming priority based on Japanese Patent Application No. 2016-009815 filed Jan. 21, 2016.

TECHNICAL FIELD

The present invention relates to a gas collecting method for collecting gas, such as methane gas, released from a sea bottom (including a lake bottom, hereinafter).

BACKGROUND ART

Recently, it has been tried to collect gases released from various kinds of gas hydrates, such as methane hydrate, that exist under a sea bottom. Gas hydrate sediment under a sea bottom separates into water and gas according to conditions such as a temperature and a pressure, and then the separated gas floats up toward a sea surface. There may be a case where the gas mixes with seawater when floating up toward a sea surface. Therefore, in order to collect gas separated from gas hydrate, it is needed to collect it before it mixes with seawater.

A Patent Document 1 listed below discloses a method for collecting seabed resources. According to the method disclosed by the Patent Document 1, crude ejected from a sea bottom is caught by a dome-shaped frame body, and then collected by a crude collecting ship on a sea surface through a pipe connected with the frame body.

PRIOR ART DOCUMENT

Patent Document

Patent Document 1: Japanese Patent Application Publication No. 2012-21357

SUMMARY OF INVENTION

However, an object of the method disclosed by the Patent Document 1 is the collection of crude, so that it is required to sink the dome-shaped frame body and fix it stably. Therefore, anchors are disposed on the sea bottom to segment a circular-shaped area, so that they may influence fishery resources on the sea bottom, such as shrimps and crabs.

An object of the present invention is to provide a gas collecting method by which a gas released from a sea bottom (lake bottom) efficiently without affecting fishery resources on a sea bottom (lake bottom).

An aspect of the present invention provides a gas collecting method for collecting gas yielding from source material that exists on a sea bottom or a lake bottom, the method comprising: releasing a collecting membrane into water, a fixture being connected with a lower end of the collecting membrane and the collecting membrane being configured of a membrane that flares downward from a top thereof; by a position maintainer provided in the fixture, recognizing a three-dimensional position of the fixture in the water and then keeping the three-dimensional position of the fixture at a target position by an autonomous navigation thereof; based on vertical water temperature distribution obtained by an CTD, setting the lower end of the collecting membrane at a position that is higher than the sea bottom or the lake bottom and shallower than a water depth where the source material separates from a solid state thereof into water and gas and setting the top of the collecting membrane at a deeper position than a water depth where bubbles of the gas disappear due to mixture of the gas with seawater or lakewater; and collecting the gas released from the sea bottom or the lake bottom by the collecting membrane.

According to the above aspect, the lower end of the collecting membrane is set at the position that is higher than the sea bottom (lake bottom) and shallower than the water depth where the source material separates from its solid state into water and gas, so that the gas can be collected efficiently. Further, it is possible to avoid influences on fishery resources on the sea bottom (lake bottom).

DESCRIPTION OF EMBODIMENTS

An embodiment will be explained with reference to the drawings.

[Fundamental Configuration]

Figure 1:
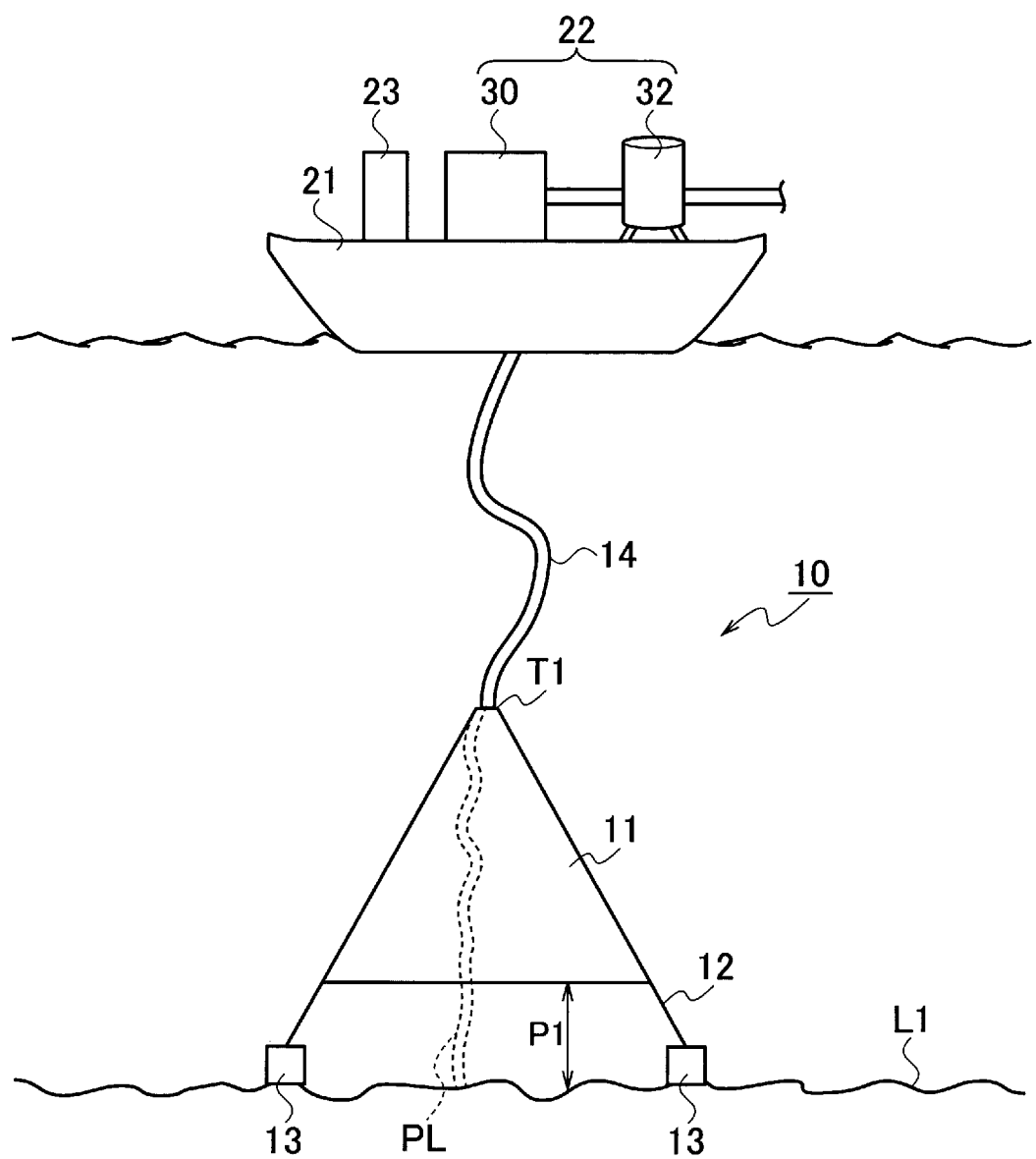
FIG. 1 is an explanatory diagram showing a fundamental configuration of a gas collecting apparatus by which to gas collecting method is done.

First, fundamental configuration of a gas collecting apparatus by which a gas collecting method is done will be explained before explaining an embodiment. As shown in FIG. 1, the gas collecting apparatus 10 includes a collecting membrane 11 that is sunk from a ship 21 floating on a sea to a sea bottom (lake bottom) L1 and then flares downward. Namely, the collecting membrane 11 is configured of a membrane that flares downward from its top T1. A distance from a lower end of the collecting membrane 11 to the top T1 is 100 m, for example. The collecting membrane 11 is supported by four wires 12. Weights 13 to be settled on the sea bottom L1 are connected with lower ends of the wires 12, respectively. Namely, the weights 13 are attached to the lower end of the collecting membrane 11, and thereby function as fixtures for keeping (stabilizing) the collecting membrane 11 at a desired water depth.

When the weights 13 are sunk onto the sea bottom L1 so that the weights 13 attached to the lower end of the wires 12 are located at corners of a rectangular area, the collecting membrane 11 supported by the wires 12 is deployed in a quadrangular pyramid manner so as to make its top T1 as an uppermost point. When the collecting membrane 11 having a quadrangular pyramid shape is sunk at an area where gas and grains of gas hydrate (source material) (e.g. methane gas and grains of methane hydrate) are released from the sea bottom L1 and a gas plume(s) PL exist, the gas and the gas hydrate that are released from a seabed surface can be collected by the collecting membrane 11. Note that, hereinafter, explanations will be made with an example where the gas hydrate is methane hydrate and the gas to be collected is methane gas.

One end of a tube 14 (e.g. a double helical tube) is connected to the top T1 (or a vicinity thereof) of the collecting membrane 11. The other end of the tube 14 is connected with a shipboard unit 22 provided on the ship 21. Namely, methane gas collected by the collecting membrane 11 is supplied to the shipboard unit 22 through the tube 14.

The shipboard unit 22 includes equipments such as a gas liquid separator 30 connected with the tube 14 and a pressure accumulating tank 32 for accumulating the collected methane. The shipboard unit 22 extracts methane gas from the methane gas collected through the tube 14 and gas-liquid mixtures collected along with the methane gas, and then sends it out to a downstream equipment. For example, the extracted methane gas is sent out to a tank for accumulating gases through a pipeline.

The collecting membrane 11 is made of material having long-time durability such that it isn't expanded or shrunk and doesn't degrade even when it is left in seawater over a long period of time.

The lower end of the collecting membrane 11 is distanced from the sea bottom L1 (see a distance P1 in FIG. 1). Namely, the weights 13 are sunk onto the sea bottom L1, but the lower end of the collecting membrane 11 is located at a higher (shallower) position than the sea bottom L1. In addition, the top T1 of the collecting membrane 11 is located at a deeper position than a water depth where methane gas mixes with seawater and thereby its bubbles disappear. According to this configuration, methane gas can be collected in a state where methane hydrate (source material) separates into water and the methane gas. Further, even in a case where methane gas will mix with seawater, the methane gas can be collected before it mixes completely with the seawater.

Here, a water depth where methane hydrate (source material) separates into water and gas and a water depth where bubbles of methane gas disappear vary depending on a seawater temperature. Hereinafter, relationship between a water depth where methane hydrate separates into water and gas and a seawater temperature will be explained with reference to FIG. 2.

Figure 2:
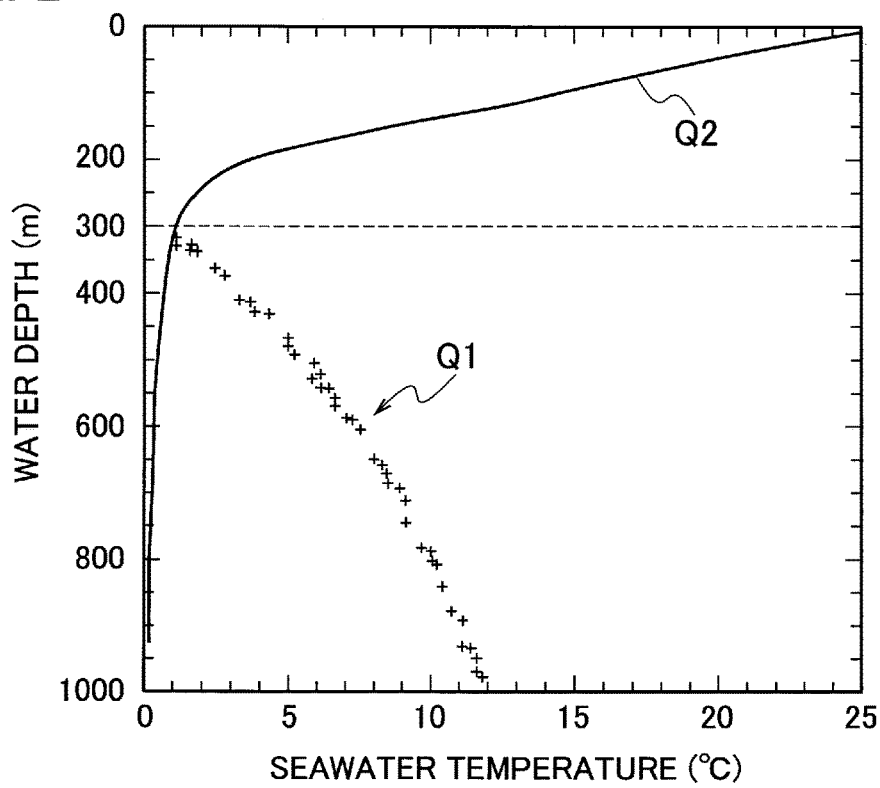
FIG. 2 is a graph showing relationship between a seawater temperature and a water depth with which methane hydrate separates into water and methane.

A lateral axis of a graph shown in FIG. 2 indicates a seawater temperature (° C.), and its vertical axis indicates a depth from a sea surface. + marks indicated by a reference sign Q1 denote seawater temperatures and water depths, computed through calculations, with which methane hydrate (solid) separates into water and gas. Therefore, a ([an] approximate) curved line (Q1) obtained from the + marks indicated by the reference sign Q1 is a methane hydrate stability zone curve. On the left side of the curved line Q1, methane hydrate exists as solid. On the right side of the curved line Q1, methane hydrate separates into water and methane gas. Therefore, as known from the curved line Q1, the lower a seawater temperature gets, the shallower a water depth for existence as methane hydrate (solid) becomes. For example, at a water depth 500 m, methane hydrate separates into water and gas when a water temperature is higher than 5° C. At a water depth 300 m, methane hydrate separates into water and gas when a water temperature is higher than 2° C.

Note that a curved line Q2 shown in FIG. 2 denotes a typical water temperature change in a sea area of the Japan Sea. As known from the curved line Q2, a water temperature rapidly increases when being shallower than a water depth 300 m. Namely, based on correspondence between the curved line Q2 of a target sea area (the sea area of the Japan Sea, here) and the methane hydrate stability zone curve Q1, a water depth where methane gas disappears can be obtained. In the example shown in FIG. 2, it can be known that methane gas is produced from methane hydrate almost at a water depth 300 m. Therefore, when the collecting membrane 11 is disposed so that the lower end of the collecting membrane 11 is located shallower than the water depth 300 m, methane gas produced from methane hydrate can be collected.

When a water depth of the lower end of the collecting membrane 11 is made shallower, methane gas mixes with seawater and thereby the methane gas cannot be collected efficiently. Therefore, it is preferable to locate the lower end of the collecting membrane 11 at a water depth close to that of an intersection point of the curved line Q1 and the curved line Q2.

Next, explained will be processes for collecting methane gas from the methane plume PL released from the sea bottom L1 by use of the above-explained gas collecting apparatus 10. First, the ship 21 is moved to a sea surface above the methane plume PL when confirming the methane plume PL at which methane gas is released from the sea bottom L1 and going to collect the methane gas contained in the methane plume PL. Subsequently, the weights 13 are sunk onto the sea bottom, and then the weights 13 are moved to desired positions, respectively, by using a robot(s) that operates undersea. Specifically, the weights 13 are moved by remote control by use of the robot(s) so that the methane plume PL is located at almost the center of the deployed collecting membrane 11. Note that various types of robots that operate undersea are known, so that detailed explanations of configuration and operations of the robot(s) are omitted.

Figure 3:
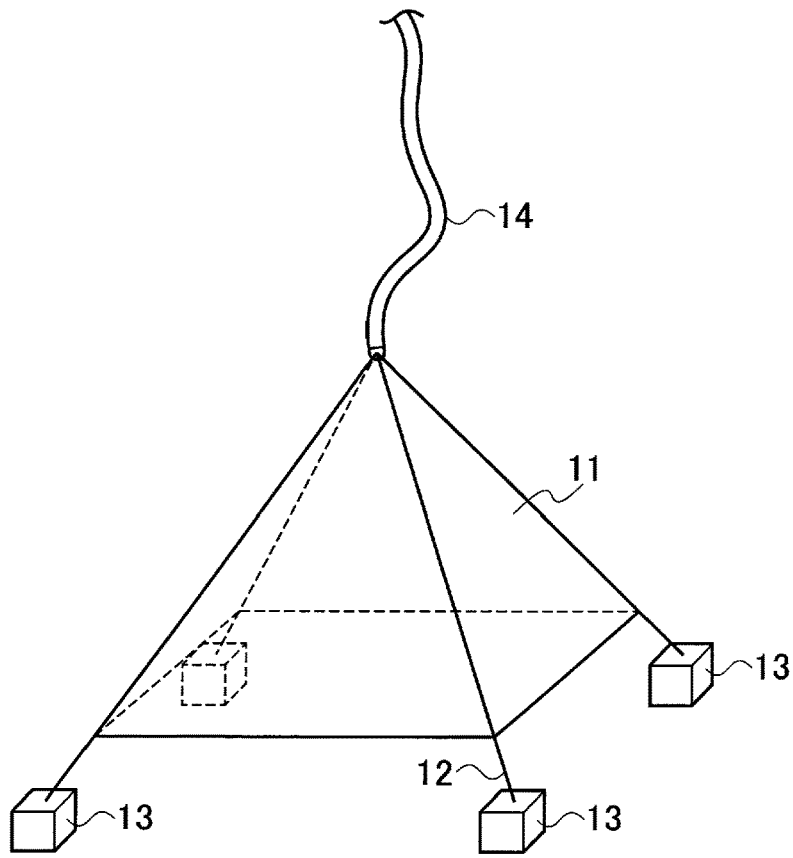
FIG. 3 is a perspective view of the gas collecting apparatus.

The weights 13 are connected with the wires 12, respectively, and the collecting membrane 11 is attached to the wires 12. Therefore, the collecting membrane 11 deploys downward in a quadrangular pyramid manner from its top T1 as a base point (see FIG. 3). Here, the collecting membrane 11 is deployed in a quadrangular pyramid manner by using the four weights 13. However, the collecting membrane 11 may be deployed in a polygonal pyramid manner by using the three, five or more weights 13. In addition, it is preferable that a shape of the deployed collecting membrane 11 is a petrosa like as a polygonal pyramid or a circular cone, but it is not limited to those. It is sufficient that the collecting membrane 11 is deployed in a shape in which it flares downward and its top T1 is the uppermost point.

The lower end of the collecting membrane 11 is located at a higher position than the sea bottom L1. Since a clearance is formed between the sea bottom L1 and the lower end of the collecting membrane 11 as shown by the distance P1 (see FIG. 1), it is possible to mitigate influence to fishery resources that live on the sea bottom.

In addition, the top T1 of the collecting membrane 11 is located at a deeper position than a water depth where methane gas cannot be detected by an acoustic sonar due to its mixture with water. Methane gas separated from methane hydrate mixes with seawater while floating upward by almost 100 to 200 m, and thereby it cannot be detected by an acoustic sonar.

However, in this configuration, the top T1 of the collecting membrane 11 is set at a deeper position than a water depth where methane gas cannot be detected by an acoustic sonar due to its mixture with water. Therefore, it is possible to collect methane gas by the collecting membrane 11 before it mixes with seawater. The collected methane gas is introduced into the tube 14 connected to the top T1 of the collecting membrane 11, and then supplied to the shipboard unit 22 provided on the ship 21. The supplied methane gas is separated by the gas liquid separator 30, and then accumulated in the pressure accumulating tank 32.

Since methane gas is collected by the collecting membrane 11 that flares downward in the above-explained manner in the gas collecting apparatus 10 having the above fundamental configuration, it is possible to collect the methane gas yielded from the methane plume PL efficiently.

In addition, since the lower end of the collecting membrane 11 is set at a higher (shallower) position than the sea bottom L1, it is possible to avoid influences on fishery resources. Further, since the lower end of the collecting membrane 11 is set at a shallower position than a water depth where methane hydrate separates into water and methane gas, it is possible to collect methane gas efficiently.

Furthermore, since methane gas yielded from the methane plume PL is collected by the gas collecting apparatus 10 having the above fundamental configuration differently from a conventional method that collects it by use of a drilling rig, it is possible to move the apparatus easily. Since it can be moved easily, it is possible to easily collect methane gas released from superficial-type methane hydrates that are scattered.

Embodiment

Next, a gas collecting method (gas collecting apparatus 50) according to an embodiment will be explained. In the above-explained fundamental configuration, the weights 13 are sunk onto the sea bottom L1, and the collecting membrane 11 is deployed by the wires 12 connected with the weights 13. In the present embodiment, ends of the wires 12 are connected with non-cable type (untethered) underwater robots 31 that function as the weights, respectively. The collecting membrane 11 is deployed via the wires 12 by locating the underwater robots 31 at a desired water depth under the sea. Namely, the underwater robots 31 function as fixtures that keep the collecting membrane 11 at a desired water depth. Furthermore, the underwater robots 31 also function as a position maintainer that keeps positions of the fixtures.

Figure 4:
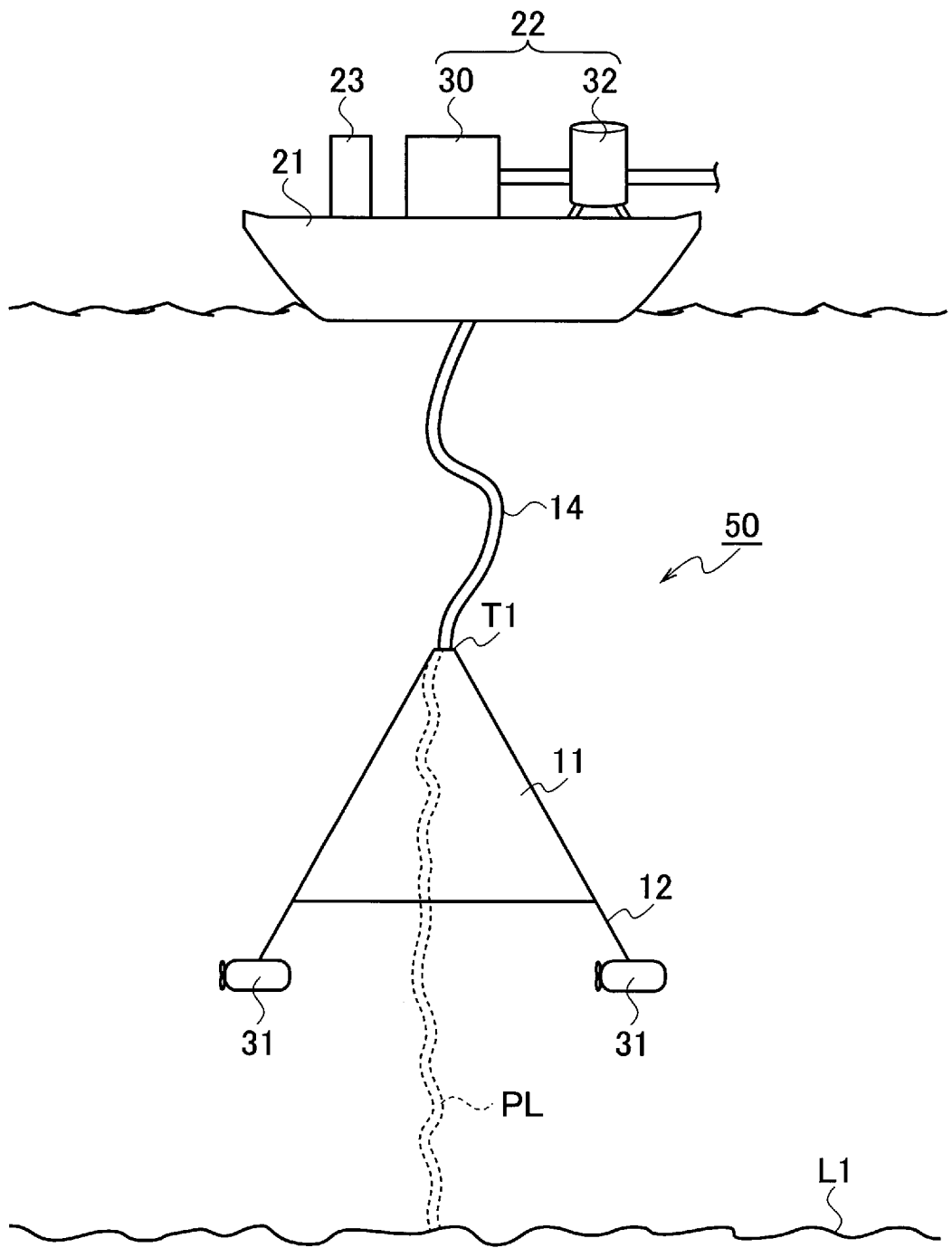
FIG. 4 is an explanatory diagram showing configuration of a gas collecting apparatus by which a gas collecting method according to an embodiment is done.

As shown in FIG. 4, the gas collecting apparatus 50 in the present embodiment includes the collecting membrane 11 that is drooped from the ship 21 floating on the sea toward the sea bottom L1 and flares downward. Namely, the collecting membrane 11 is configured of a membrane that flares downward from the top T1. The collecting membrane 11 is supported by the four wires 12, and each lower end of the wires 12 is connected with the underwater robot 31 for keeping it at a desired undersea position.

One end of the tube 14 is connected to the top T1 of the collecting membrane 11, and the other end of the tube 14 is connected to the shipboard unit 22 provided on the ship 21. Namely, methane gas collected by the collecting membrane 11 is supplied to the shipboard unit 22 through the tube 14.

The underwater robot(s) 31 has a function for recognizing its own position, and can move autonomously in all-round directions. Namely, if coordinates of a target position have been set, the underwater robots 31 move autonomously toward the target position and then keep themselves at the target position. Therefore, even when a lateral force applies to the collecting membrane 11 according to influences such as a tidal stream, the underwater robots 31 moves autonomously against the tidal stream and thereby keep themselves at the target position. As the result, it is possible to keep the collecting membrane 11 at the desired position without sinking the weights 13 onto the sea bottom L1 as in the case of the above-explained fundamental configuration.

Figure 5:
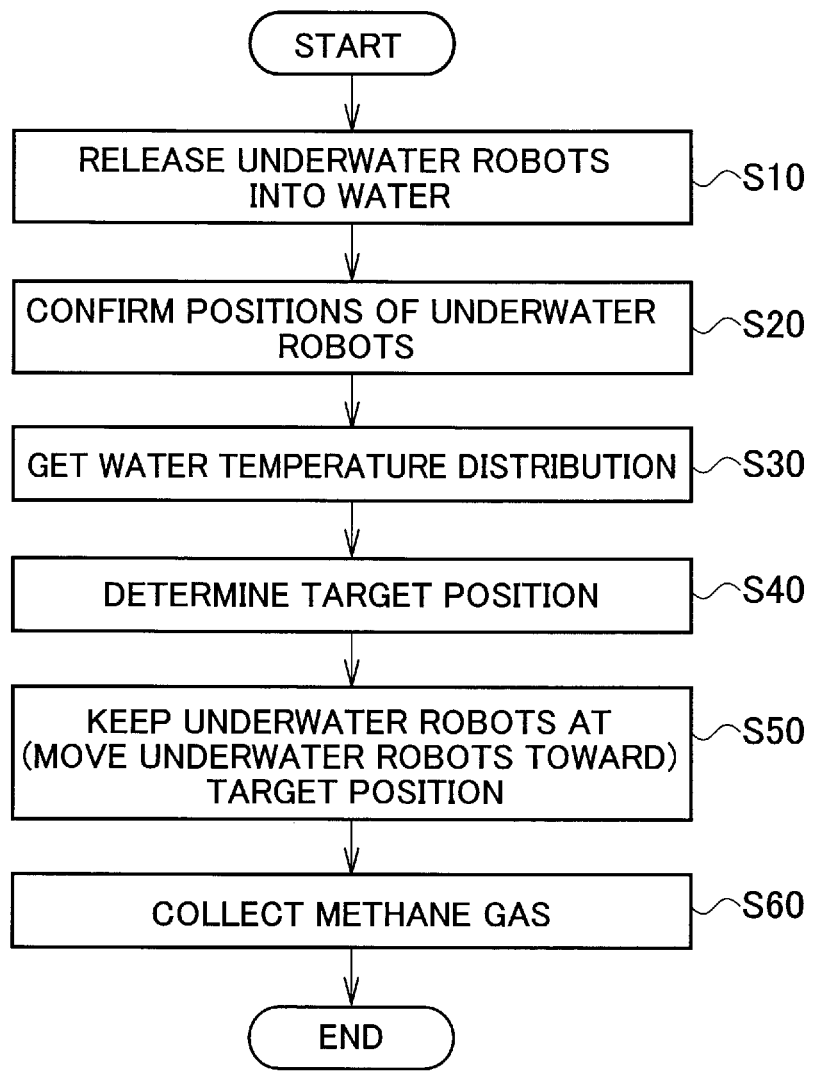
FIG. 5 is a flowchart of collecting processes by use of the gas collecting apparatus.

Next, explained will be processes for collecting methane gas from the methane plume PL released from the sea bottom L1 by use of the above-explained gas collecting apparatus 50 (see FIG. 5). The ship 21 is moved to a sea surface above the methane plume PL when confirming the methane plume PL and going to collect methane gas contained in the methane plume PL. Subsequently, the underwater robots 31 are released into the sea (step S10) and positions of the underwater robots 31 are recognized (step S20), and then the underwater robots 31 are moved to a target position (step S50). Specifically, the underwater robots 31 are moved so that the methane plume PL is located at almost the center of the deployed collecting membrane 11. The positions of the underwater robots 31 can be recognized by wireless communications or a sonar.

In addition, the wires 12 are connected to the underwater robots 31, respectively, and the collecting membrane 11 is attached to the wires 12. Therefore, the collecting membrane 11 deploys downward in a quadrangular pyramid manner from its top T1 as a base point (see FIG. 4). In addition, when the target position of the underwater robots 31 has been determined (step S40), coordinates of the target position are made recognized by the underwater robots 31. Acquisition of water temperature distribution (step S30) and determination of the target position based on the water temperature distribution (step S40) will be explained later in detail. In addition, the target position may be preliminarily set before releasing the underwater robots 31 into the sea, or may be set by the wireless communications. Since the underwater robots 31 operate autonomously to keep the target position, it is possible to stably collect methane gas from the methane plume PL by the collecting membrane 11 (step S60).

Similarly to the above-explained fundamental configuration, methane gas of the methane plume released from the sea bottom L1 is caught by the collecting membrane 11, and then collected thorough the tube 14. The advantages of the above-explained fundamental configuration can be also brought similarly in the present embodiment. Further, further advantages can be brought by using the underwater robots 31 having autonomous navigation capability instead of the weights 13.

According to the gas collecting apparatus 50 of the present embodiment, the underwater robots 31 are connected with the ends of the wires 12, respectively, and the collecting membrane 11 is kept at the desired target position by the autonomous navigation of the underwater robots 31. Therefore, it is not needed to sink the weights 13 onto the sea bottom L1 like as the fundamental configuration, but it is possible to set the collecting membrane 11 at a desired water depth even if the water depth of the sea bottom L1 is deep. As the result, it is possible to collect methane gas without being affected by terrain of the sea bottom L1.

In addition, since the lower end of the collecting membrane 11 is located at a higher (shallower) position than a water depth where solid methane hydrate separates into water and methane gas, it is possible to collect the methane gas efficiently.

In addition, the top T1 of the collecting membrane 11 is located at a deeper position than a water depth where methane gas cannot be detected by an acoustic sonar due to its mixture with water. Methane gas separated from methane hydrate mixes with seawater while floating upward by almost 100 to 200 m, and thereby it cannot be detected by an acoustic sonar.

However, in the present embodiment, the top T1 of the collecting membrane 11 is set at a deeper position than a water depth where methane gas cannot be detected by an acoustic sonar due to its mixture with water. Therefore, it is possible to collect methane gas by the collecting membrane 11 before it mixes with seawater. The collected methane gas is introduced into the tube 14 connected to the top T1 of the collecting membrane 11, and then supplied to the shipboard unit 22 provided on the ship 21. The supplied methane gas is separated by the gas liquid separator 30, and then accumulated in the pressure accumulating tank 32.

Note that the underwater robots 31 are connected with the ends of the wires 12, respectively, in the present embodiment. However, the weights may be also connected together with the underwater robots 31 in order to get desired mass.

Modified Example

Next, a modified example of the above embodiment will be explained. In the above embodiment, the collecting membrane 11 is kept at the desired target position by the autonomous navigation of the non-cable type underwater robots 31. On the other hand, the collecting membrane 11 is kept at the desired target position by cable type (tethered) underwater robots 41 in the present modified example. Hereinafter, the modified example will be explained with reference to FIG. 6.

Figure 6:
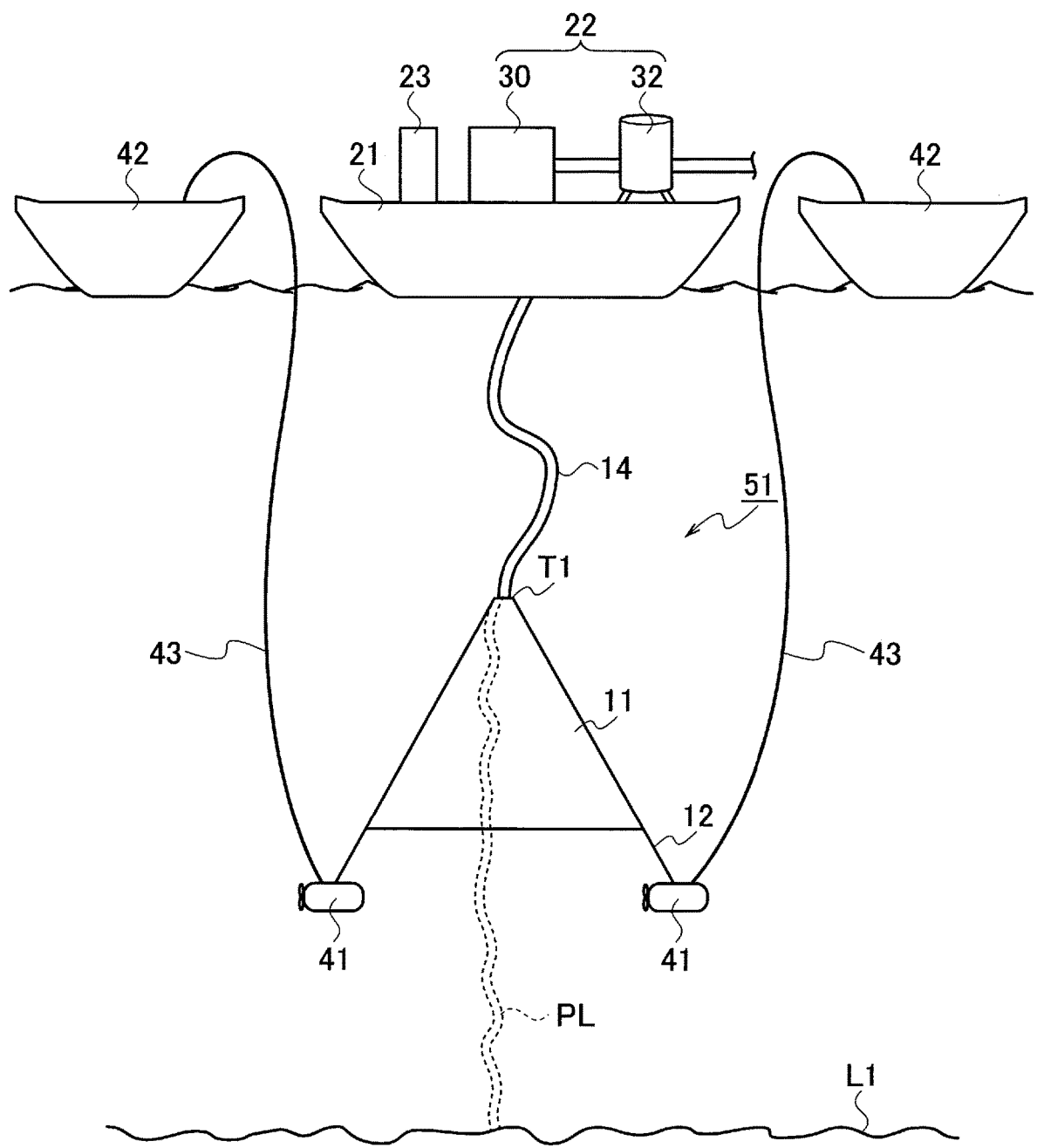
FIG. 6 is an explanatory diagram showing configuration of a modified example of the gas collecting apparatus.

As shown in FIG. 6, similarly to the above embodiment, a gas collecting apparatus 51 in the present modified example includes the collecting membrane 11 that is drooped from the ship 21 floating on the sea toward the sea bottom (lake bottom) L1 and flares downward. Namely, the collecting membrane 11 is configured of a membrane that flares downward from the top T1. The collecting membrane 11 is supported by the four wires 12. Each lower end of the wires 12 is connected with the cable type underwater robot 41 for keeping the collecting membrane 11 at a desired undersea position.

Plural support ships 42 for keeping each undersea position of the underwater robots 41 are float on the sea surface. The support ships 42 are connected with the underwater robots 41 by support wires 43, respectively. Note that only two sets of the underwater robot 41 and support ship 42 are shown in FIG. 6, but the collecting membrane 11 is deployed by four sets of the underwater robot 41 and support ship 42.

The support ship(s) 42 has a function for recognizing its own position, and can recognize a position (latitude/longitude) of the underwater robot 41 based on a relative positional relationship with the underwater robot 41. Therefore, even if the underwater robot(s) 41 never has an autonomous navigation function and a function for recognizing its own position, it is possible to keep the underwater robots 41 at the desired target position by controlling positions of the support ships 42. Note that the target position may be preliminarily set before releasing the underwater robots 41 into the sea, or may be set by wireless communications or by wired communications through the support wires 43. The positions of the underwater robots 41 can be also recognized by wireless/wired communications or a sonar.

According to the gas collecting apparatus 51 of the present modified example, the cable type underwater robots 41 are connected with the ends of the wires 12, respectively, and the support ships 42 are connected with the underwater robots 41, respectively. The collecting membrane 11 is kept at the desired target position by moving the underwater robots 41 by the navigation of the support ships 42. Therefore, it is not needed to sink the weights 13 onto the sea bottom L1 like as the fundamental configuration, but it is possible to set the collecting membrane 11 at a desired water depth even if the water depth of the sea bottom L1 is deep. As the result, it is possible to collect methane gas without being affected by terrain of the sea bottom L1. In addition, since the underwater robots 41 are connected with the support ships 42 via the support wires 43, respectively, it is not needed to give an autonomous navigation function to the underwater robots 41. Therefore, it is possible to simplify the configuration of the underwater robot(s) 41 and to reduce a scale of the apparatus.

With respect to the above-mentioned determination of the target position (step S40), the vertical water temperature distribution for the sea area is preliminarily obtained by utilizing an measurement instrument 23 such as a CTD (Conductivity Temperature Depth profiler) (step S30), and then a water depth of the target position of the collecting membrane 11 is determined based on a water depth of an intersection point of this water temperature distribution (see the curved line Q2 in FIG. 2) and the methane hydrate stability zone curve (see the curved line Q1 in FIG. 2). In addition, the horizontal coordinates of the target position of the collecting membrane 11 are determined in consideration of the position of (path to) the methane plume PL. A position of the collecting membrane 11, with which the lower end of the collecting membrane 11 is set at a shallower position than a water depth where methane hydrate separates into water and gas and the top T1 of the collecting membrane 11 is set at a deeper position than a water depth where bubbles of methane gas disappear due to mixture with seawater, is set as the target position (step S40).

The gas collecting method according to the present invention is not limited to the above embodiment (and the modified example thereof). Configuration of each element may be replaced with arbitrary configuration having an equivalent function.

For example, in the above embodiment, methane gas released from methane hydrate that exists under a sea bottom (including a lake bottom as already explained above) is collected. However, the present can be applied to a case of collecting gas released from gas hydrate other than methane hydrate, such as ethane hydrate or butane hydrate.

In addition, it is sufficient that the acquisition of the water temperature distribution (step S30) is done before the determination of the target position (step S40). Further, the determination of the target position (step S40) may be done before releasing the underwater robots 31 (41) into the sea or after releasing them. However, the determination of the target position (step S40) must be done before keeping the underwater robots 31 (41) at the target position (moving them toward the target position) (step S50).

The invention claimed is:

1. A gas collecting method for collecting gas seeping from source material that exists at a seafloor or a lake floor, the method comprising:
   releasing a collecting membrane into water, a fixture being connected with a lower end of the collecting membrane and the collecting membrane being configured of a membrane that flares downward from a top thereof;
   by a position maintainer provided in the fixture, recognizing a three-dimensional position of the fixture in the water and then keeping the three-dimensional position of the fixture at a target position by an autonomous navigation thereof;

based on vertical water temperature distribution obtained by a Conductivity Temperature Depth (CTD) profiler, setting the lower end of the collecting membrane at a position that is higher than the seafloor or the lake floor and shallower than a water depth where the source material separates from a solid state thereof into water and gas and setting the top of the collecting membrane at a deeper position than a water depth where bubbles of the gas disappear due to mixture of the gas with seawater or lakewater; and collecting the gas released from the seafloor or the lake floor by the collecting membrane, wherein the gas collecting method further comprises:

setting a water depth close to an intersection point of the water temperature distribution and a methane hydrate stability zone curve as a position of the lower end of the collecting membrane, wherein the methane hydrate stability zone curve refers to a relationship of a water depth and a water temperature with which the methane hydrate separates into water and gas.

2. The gas collecting method according to claim 1, wherein the source material is methane hydrate, the gas collecting method further comprises:

obtaining the methane hydrate stability zone curve that denotes relationship of a water depth and a water temperature with which the methane hydrate separates into water and gas.

3. The gas collecting method according to claim 1, wherein the water depth close to an intersection point of the water temperature distribution and a methane hydrate stability zone curve being detected by a sonar.

* * * * *